US011466490B2

(12) United States Patent
 Bassan et al.

(10) Patent No.: US 11,466,490 B2
(45) Date of Patent: Oct. 11, 2022

(54) HINGE OF A MOTOR-VEHICLE MOBILE PART

(71) Applicant: C.R.F. Società Consortile per Azioni, Orbassano (IT)

(72) Inventors: Daniele Bassan, Orbassano (IT); Silvano Sandri, Orbassano (IT); Michele Longo, Turin (IT); Stefano Paradiso, Turin (IT); Carlo Carcioffi, Modena (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 162 days.

(21) Appl. No.: 16/933,260

(22) Filed: Jul. 20, 2020

(65) Prior Publication Data

US 2021/0032915 A1    Feb. 4, 2021

(30) Foreign Application Priority Data

Jul. 29, 2019    (EP) .................................... 19188862

(51) Int. Cl.
 *E05D 3/12* (2006.01)
 *B33Y 80/00* (2015.01)
 (Continued)

(52) U.S. Cl.
 CPC .............. *E05D 3/125* (2013.01); *B33Y 80/00* (2014.12); *E05D 5/0207* (2013.01); *E05D 9/00* (2013.01); *E05Y 2900/50* (2013.01)

(58) Field of Classification Search
 CPC .. E05D 5/12; E05D 5/16; E05D 5/127; E05D 5/062; E05D 5/0207; E05D 9/00;
 (Continued)

(56) References Cited

U.S. PATENT DOCUMENTS 7,895,712 B2 * 3/2011 Krumbiegel ............ E05D 7/121
 16/DIG. 43
8,505,164 B2 * 8/2013 Katou ...................... E05D 3/02
 16/386
(Continued)

FOREIGN PATENT DOCUMENTS

| EP | 1043467 B1 | 5/2002 |
| WO | 2008006191 A1 | 1/2008 |
| WO | 2015181772 A1 | 12/2015 |

OTHER PUBLICATIONS

Youtube Video: Fusion 360 Tutorial—Print-In-Place Hinge—Layer by Layer, Screenshots captured on Jan. 27, 2020, 2 pp., https://www.youtube.com/watch?v=M6AqZDa IXHM.

(Continued)

*Primary Examiner* — William L Miller
(74) *Attorney, Agent, or Firm* — Heslin Rothenberg Farley & Mesiti P.C.; Victor A. Cardona, Esq.

(57) ABSTRACT

A hinge of a motor-vehicle mobile part includes a first and a second hinge element mounted articulated with respect to each other about a hinge axis. The second hinge element is articulated to the first hinge element by an articulation portion having two pins defining the hinge axis, and projecting in opposite directions from two sides of the second hinge element. The first hinge element and the second hinge element are obtained by an additive manufacturing technique in an already reciprocally articulated condition, with the pins mounted with clearance within respective articulation seats formed on two flanges of the first hinge element adjacent to the sides of the second hinge element. The hinge also includes two bushing-shaped members, each interposed between one of said two pins and the respective articulation seat.

17 Claims, 3 Drawing Sheets

Figure 1:
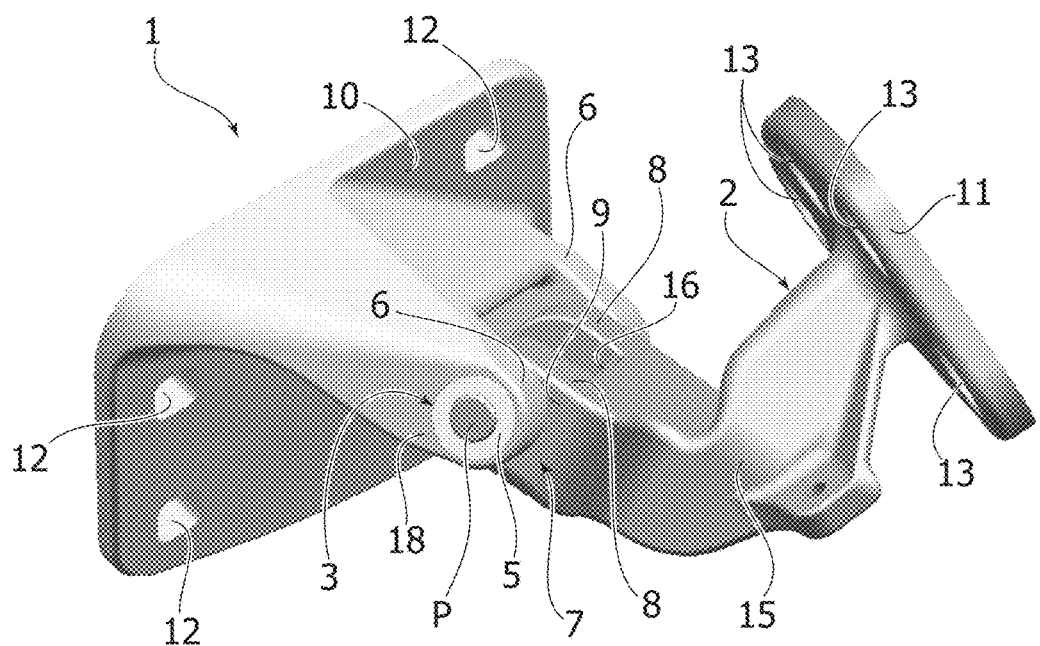

(51) Int. Cl.
  *E05D 9/00* (2006.01)
  *E05D 5/02* (2006.01)
(58) Field of Classification Search
  CPC .......... E05D 9/005; E05D 3/02; E05D 3/125;
       E05D 3/127; B33Y 80/00; B33Y 10/00;
       E05Y 2800/45; E05Y 2800/674; E05Y
       2800/676; E05Y 2900/531; E05Y
       2900/50; Y10T 16/52; Y10T 16/557;
       Y10T 16/558; Y10T 16/537
  USPC ............... 16/221, 386, 387, 273; 296/146.11
  See application file for complete search history.

(56) References Cited

U.S. PATENT DOCUMENTS

| | | | | |
|---|---|---|---|---|
| 10,184,280 | B2* | 1/2019 | Rahman | E05D 5/121 |
| 10,619,390 | B2* | 4/2020 | Suesada | E05D 5/062 |
| 10,781,618 | B2* | 9/2020 | Mori | E05D 5/062 |
| 2008/0150320 | A1* | 6/2008 | Hofacker | E05D 11/00 |
| | | | | 296/146.11 |
| 2008/0295290 | A1* | 12/2008 | Murray | E05D 5/12 |
| | | | | 16/386 |
| 2015/0026924 | A1* | 1/2015 | Morinaga | E05D 5/062 |
| | | | | 16/277 |
| 2015/0314673 | A1* | 11/2015 | Watterworth | E05D 5/062 |
| | | | | 16/382 |
| 2017/0058585 | A1* | 3/2017 | Choi | E05D 5/062 |
| 2017/0096847 | A1 | 4/2017 | Liu et al. | |
| 2017/0321463 | A1* | 11/2017 | Morinaga | B60J 5/04 |
| 2017/0350176 | A1* | 12/2017 | Rahman | E05D 5/121 |
| 2019/0194988 | A1* | 6/2019 | Mori | E05D 3/02 |
| 2019/0194989 | A1* | 6/2019 | Su | E05D 3/02 |
| 2019/0292821 | A1* | 9/2019 | Gunner | E05D 5/12 |
| 2020/0181961 | A1* | 6/2020 | Lee | B22F 10/20 |
| 2020/0284078 | A1* | 9/2020 | Prim | E05D 3/02 |
| 2020/0408014 | A1* | 12/2020 | Morinaga | B62D 65/06 |
| 2022/0041113 | A1* | 2/2022 | Bennett | E05D 11/00 |
| 2022/0042362 | A1* | 2/2022 | Freedman | E05D 3/02 |

OTHER PUBLICATIONS

European Search Report dated Jan. 27, 2020, 5 pp.

* cited by examiner

HINGE OF A MOTOR-VEHICLE MOBILE PART

CROSS REFERENCE TO RELATED APPLICATIONS

This application claims priority from European Patent Application No. 19188862.7 filed on Jul. 29, 2019, the entire disclosure of which is incorporated herein by reference.

FIELD OF THE INVENTION

The present invention relates to a hinge of a motor-vehicle mobile part comprising:

a first hinge element intended to be connected to either the mobile part of a motor-vehicle or the motor-vehicle structure, a second hinge element intended to be connected to the other of said motor-vehicle structure or said mobile part of the motor-vehicle, wherein said first and second hinge elements are mounted articulated with respect to each other about a hinge axis.

PRIOR ART AND OBJECT OF THE INVENTION

The documents EP 1 043 467 B1 and US 2017/0096847 A1 disclose, respectively, a motor-vehicle door hinge of the type indicated above, and a component with movable parts, such as a hinge, made by an additive manufacturing technique.

The present invention is based on the requirement to produce a hinge of a motor-vehicle mobile part of the type indicated above (for example, for a side door, a rear door or a bonnet) that is simpler and more functional than the known solutions.

An additional object of the present invention is to produce a hinge of a motor-vehicle mobile part of the type indicated above that has a rapid and low-cost production method, without thereby being less effective in realizing the functions for which it is designed.

SUMMARY OF THE INVENTION

With a view of achieving one or more of the aforesaid objects, the invention relates to a hinge of a motor-vehicle mobile part comprising:

a first hinge element intended to be connected to either the mobile part of a motor-vehicle or the motor-vehicle structure, a second hinge element intended to be connected to the other of said motor-vehicle structure or said mobile part of the motor-vehicle, wherein said first and second hinge elements are mounted articulated with respect to each other about a hinge axis, wherein said second hinge element is articulated to said first hinge element by means of an articulation portion having two pins defining the hinge axis, and projecting in opposite directions from two sides of said articulation portion of the second hinge element, wherein said pins are formed in a single piece with the second hinge element, wherein the first hinge element and the second hinge element are obtained by an additive manufacturing technique in an already reciprocally articulated condition, with said pins mounted with clearance within respective articulation seats formed on two flanges of the first hinge element adjacent to said sides of the second hinge element, so that the two hinge elements are permanently bound to each other, said hinge further comprising two bushing-shaped members, each interposed between one of said two pins and the respective articulation seat.

Thanks to these characteristics, the hinge of the motor-vehicle mobile part according to the present invention is produced by means of a rapid and low-cost production method, resulting in being even simpler and more functional with respect to the known solutions.

In a preferred embodiment, the articulation portion of the second hinge element includes two inner flanges that define the sides from which the two pins formed in one piece with the second hinge element project.

Still with reference to the preferred embodiment, the first and the second hinge elements each comprise a connection bracket equipped with respective holes for engaging a plurality of fastening members, for connection to either a motor-vehicle structure or a mobile part of the motor-vehicle.

According to another characteristic of the preferred embodiment, each bushing-shaped member has a base surface, a side surface and an upper surface in which the base surface is arranged in abutment on a respective side of the second hinge element, and the upper surface is adjacent to an outer side of the respective flange of the first hinge element. Each bushing-shaped member is mounted by interference fit within the respective articulation seat, so as to allow the respective pins to rotate within it.

Preferably, the bushing-shaped members are made of a material with a low friction coefficient.

The invention also relates to a method for producing a motor-vehicle hinge comprising the following steps:

producing a first hinge element and a second hinge element already reciprocally articulated with respect to each other about a hinge axis by means of an additive manufacturing technique, wherein said second hinge element is articulated to said first hinge element by means of an articulation portion having two pins defining the hinge axis and projecting in opposite directions from two sides of said articulation portion of the second hinge element, wherein said pins are mounted with clearance within respective articulation seats formed on two flanges of the first hinge element adjacent to said sides of the second hinge element, so that the two hinge elements are permanently bound to each other, mounting two bushing-shaped members within a respective articulation seat of the first hinge element, in such a way that each bushing-shaped member is interposed between one of said two pins and the respective articulation seat.

DETAILED DESCRIPTION OF AN EMBODIMENT OF THE INVENTION

Figure 2:
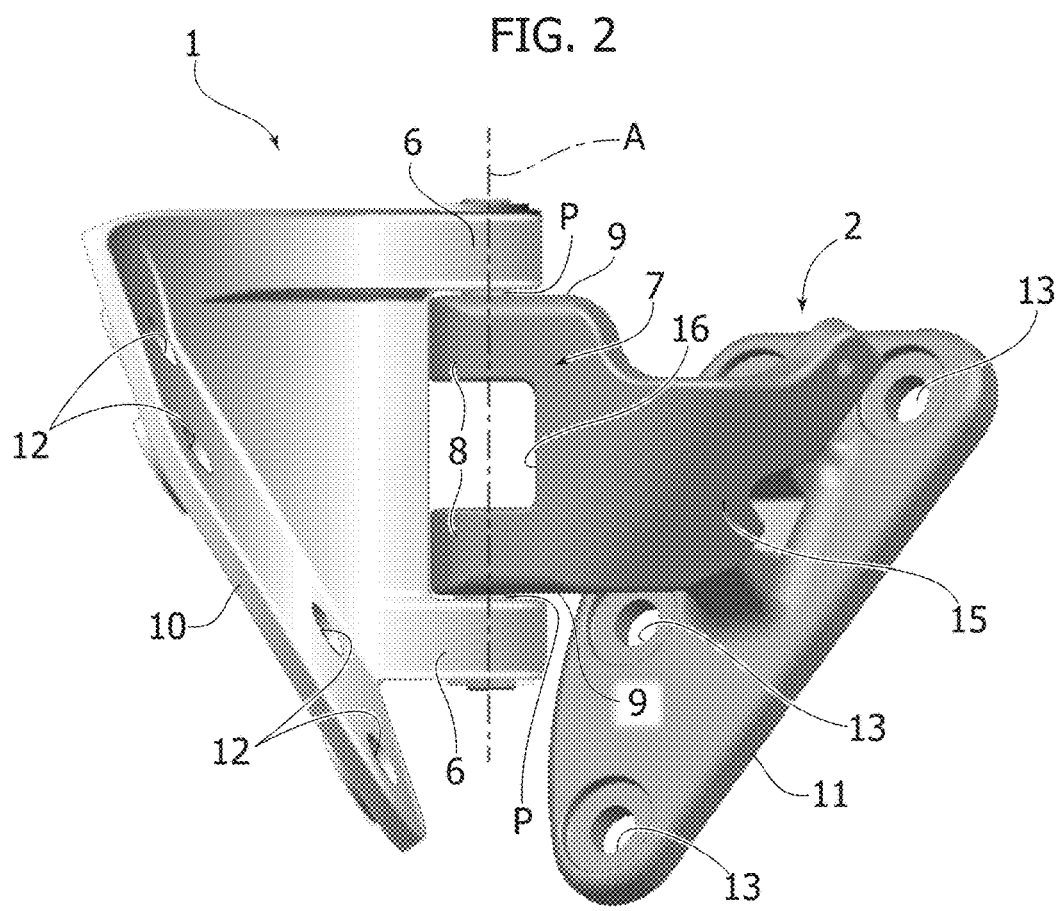
Figure 3:
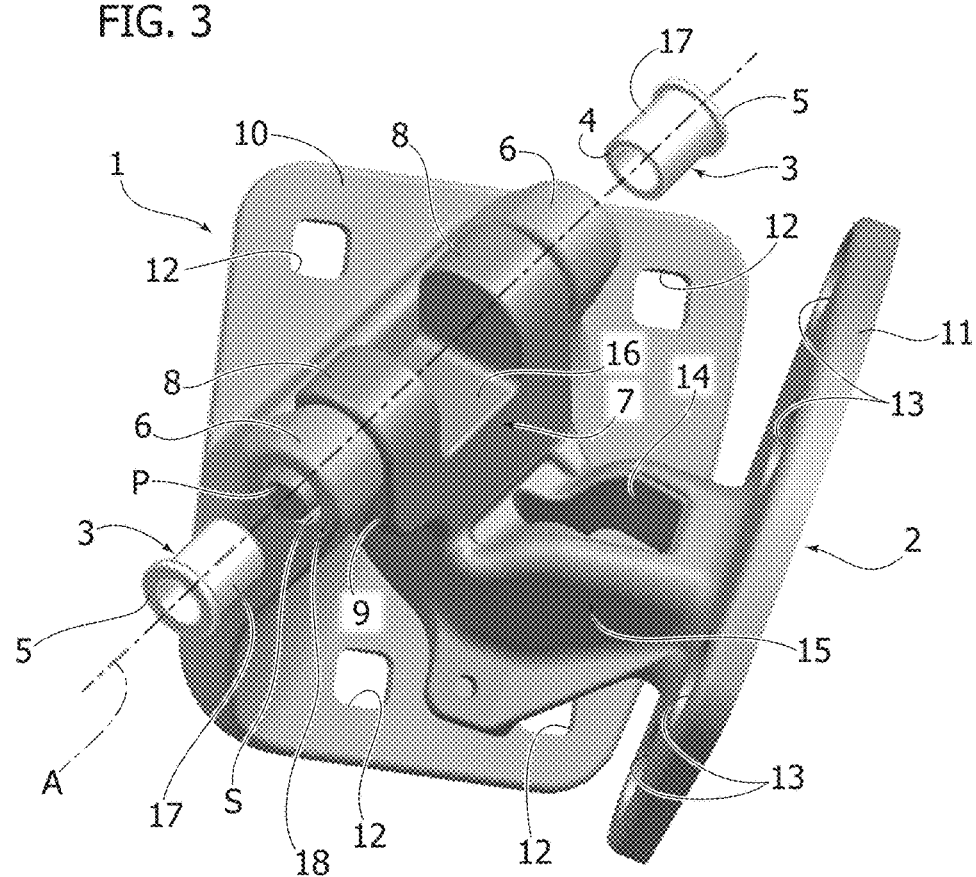
Figure 4:
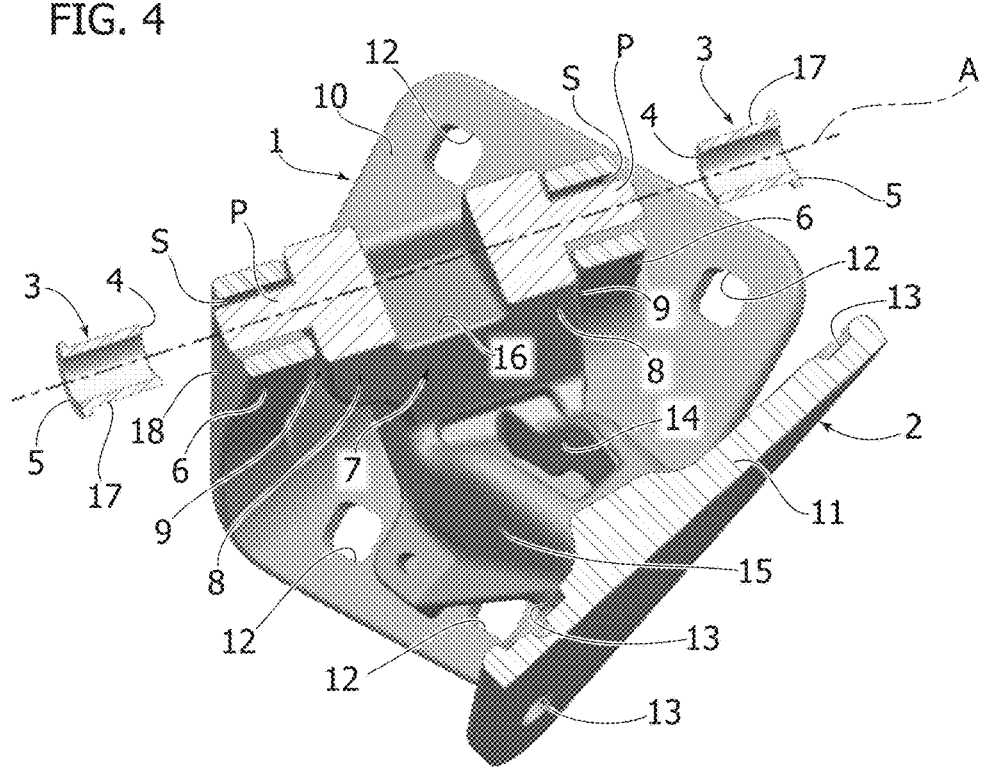
Figure 5:
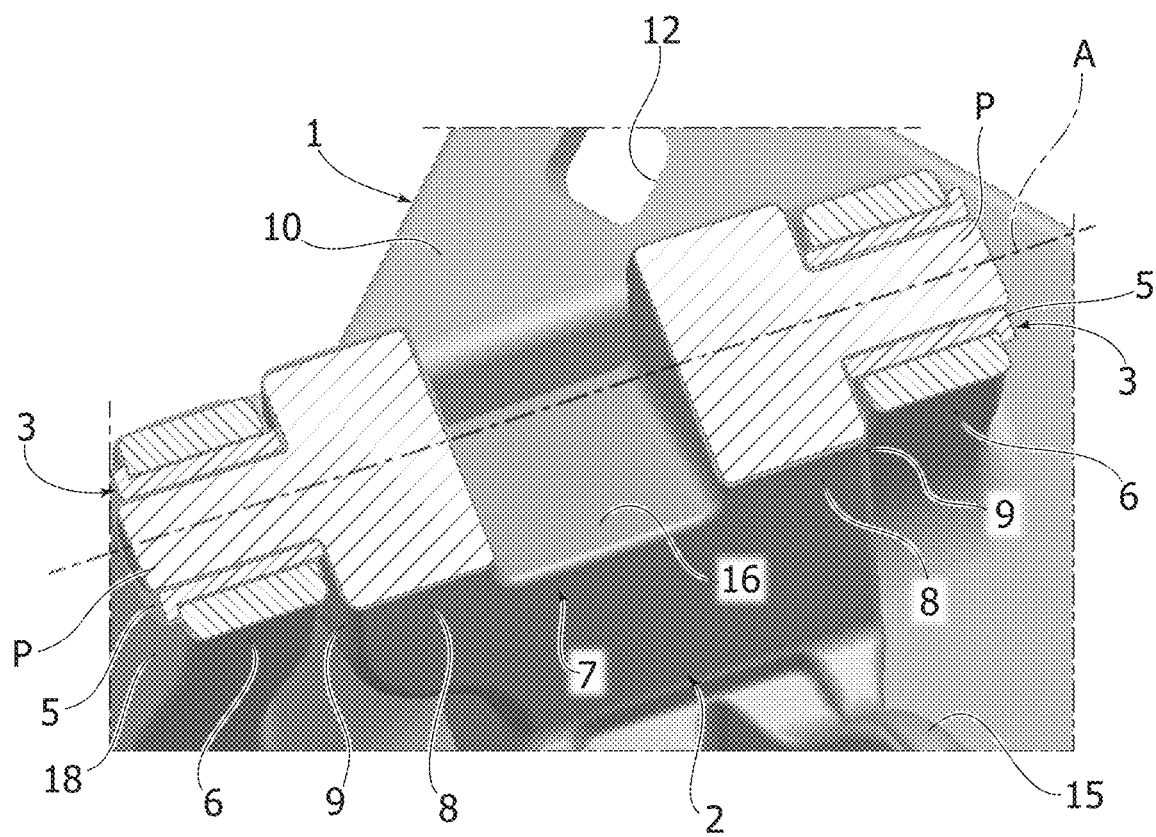

Further characteristics and advantages of the invention will become apparent from the description that follows with reference to the attached drawings, provided purely by way of non-limiting example, wherein:

FIGS. 1 and 2 illustrate two perspective views of a preferred embodiment of a motor-vehicle hinge according to the present invention, FIGS. 3, 4 illustrate, respectively, a partially exploded perspective view and a partially cross-sectioned perspective view of the details illustrated in the preceding figures, and FIG. 5 illustrates a partially cross-sectioned perspective view of some details illustrated in the preceding figures.

In the following description, various specific details are illustrated aimed at a thorough understanding of the embodiments. The embodiments can be implemented without one or more of the specific details, or with other methods, components, materials, etc. In other cases, known structures, constructive details, materials or operations are not illustrated and described in detail, since they can be produced in any known way and also because they do not fall within the scope of the present invention.

In the present description and in the claims that follow, the term "additive manufacturing" means a method, known in the art, in which an energy source is used, such as a laser or plasma beam, to selectively melt layers of wires or powders of metal material or plastic material, of various sizes, so as to form layer after layer, a component of metal material or plastic material. For example, a device for making components using additive manufacturing is known from the document EP 3 148 784 A1. Of course, the technology illustrated in this document represents just one example, since different additive manufacturing technologies can be applied to produce the device according to the present invention.

FIGS. 1-5 illustrate a preferred embodiment of a hinge of a motor-vehicle mobile part (for example, for a side door, a rear door or a bonnet) according to the present invention.

As shown in particular in FIGS. 1 and 2, the hinge comprises a first hinge element 1 and a second hinge element 2 mounted articulated with respect to one another about a hinge axis A. However, the present invention also relates to hinges having different configurations with respect to that illustrated in the attached drawings (for example, a double hinge with three mutually articulated elements, an articulated quadrilateral or a cardan joint).

In the case illustrated in the drawings, the first hinge element 1 is arranged for connection to either a motor-vehicle structure or a mobile part of a motor-vehicle, while the second hinge element 2 is arranged for connection to the other of said motor-vehicle structure or said mobile part. To create the connection with the mobile part (for example, a side door) and the motor-vehicle structure, the two hinge elements 1, 2 each comprise a connection bracket 10, 11 equipped with respective holes 12, 13 for engagement with a plurality of fastening members (not illustrated in the drawings). The constructional details relating to the way in which the first and second hinge elements 1, 2 are anchored to the structure and to a mobile part of the motor-vehicle are not presented here, since these details can be made in any known way, and also as elimination of these details from the drawings makes them more readily and easily understood.

With reference in particular to FIGS. 3-5, the second hinge element 2 is articulated to the first hinge element 1 by means of an articulation portion 7 which includes a pair of inner flanges 8 having respective outer sides 9, from which two pins P defining the hinge axis A protrude. The pins P are formed in one piece with the second hinge element 2, and project in opposite directions from the two sides 9 of the articulation portion 7 of the second hinge element 2.

In accordance with an essential characteristic of the present invention, the first hinge element 1 and the second hinge element 2 are obtained with an additive manufacturing technique in an already reciprocally articulated condition, wherein the pins P are mounted with clearance within respective articulation seats S of the first hinge element 1 (FIGS. 3, 4). More particularly, the articulation seats S of the first hinge element 1 are formed on two flanges 6 that are adjacent to the sides 9 of the inner flanges 8 of the second hinge element 2, in such a way that the two hinge elements 1, 2 are permanently bound to each other.

By producing the motor-vehicle hinge by means of an additive manufacturing technique, it is possible to obtain numerous advantages with respect to traditional production methods, for example, providing components with complex geometries without incurring penalties in terms of time or cost with respect to the production of simpler geometrical components. In the case of the invention, the hinge can be made of metal or plastic material.

Preferably, in order to reduce the overall weight of the hinge, a central recess 16 is formed between the pair of inner flanges 8 of the second hinge element 2.

According to another preferred characteristic of the present invention, the second hinge element 2 has a central portion 15, which joins the connection bracket 11 to the articulation portion 7, including a hollow portion 14.

As indicated above, the pins P—projecting in opposite directions from the sides 9—are mounted with clearance within the respective articulation seats S formed on the flanges 6 of the first hinge element 1. The two hinge elements 1, 2 are permanently bound to each other since the flanges 6, on which the articulation seats S are formed, are adjacent to the sides 9 of the inner flanges 8 from which the pins P project.

In order to allow the pins P to perform a rotational movement only about the hinge axis A, the hinge according to the present invention also comprises two bushing-shaped members 3, each interposed between a pin P and the respective articulation seat S. As illustrated in particular in FIGS. 3-5, the bushing members 3, each comprising a base surface 4, a side wall 17 and an upper surface 5, are mounted by interference fit within the respective articulation seat S, so as to allow the respective pins P to rotate therein.

In the mounted condition illustrated in FIGS. 1, 2, 5, the base surface 4 of the bushing-shaped member 3 is arranged in abutment against a respective side 9 of the second hinge element 2, while the upper surface 5 of the bushing-shaped member 3 is adjacent to an outer side 18 of the respective flange 6 of the first hinge element 1.

Preferably, the bushing-shaped members 3 are made of a material with a low friction coefficient, for example, bronze or a synthetic material.

Still according to a preferred characteristic, the upper surface 5 of each bushing-shaped member 3 has a larger area than the base surface 4, so as to provide a stable coupling with the respective outer side 18 of the flange 6 of the first hinge element 1.

Thanks to the above described characteristics of the motor-vehicle hinge according to the present invention, it is possible to produce, by means of a rapid and low-cost production method, two hinge elements permanently bound to each other, providing a structure with a simple geometry and low weight.

In addition to that indicated above, one or more embodiments of the present invention may relate to a mobile part of a motor-vehicle (for example, a side door) with a motor-vehicle hinge, having the characteristics indicated above, pre-mounted to the mobile part by means of respective fastening members.

Furthermore, one or more embodiments of the present invention may relate to a motor-vehicle body with a motor-vehicle hinge, having the characteristics indicated above, pre-mounted to the body by means of respective fastening members.

As indicated in the attached claims, the invention also relates to a method for producing a motor-vehicle hinge comprising the following steps:

producing a first hinge element and a second hinge element already reciprocally articulated with respect to each other about a hinge axis by means of an additive manufacturing technique, wherein the second hinge element is articulated to the first hinge element by means of an articulation portion having two pins defining the hinge axis and projecting in opposite directions from two sides of the articulation portion of the second hinge element, wherein said pins are mounted with clearance within respective articulation seats formed on two flanges of the first hinge element adjacent to said sides of the second hinge element, so that the two hinge elements are permanently bound to each other, and mounting two bushing-shaped members within a respective articulation seat of the first hinge element, in such a way that each bushing-shaped member is interposed between one of said two pins and the respective articulation seat.

Of course, without prejudice to the principle of the invention, the details of construction and the embodiments may vary widely with respect to those described and illustrated purely by way of example, without departing from the scope of the present invention.

What is claimed is:

1. A hinge of a motor-vehicle mobile part, comprising:
   a first hinge element intended to be connected to either a mobile part of a motor-vehicle or a motor-vehicle structure,
   a second hinge element intended to be connected to the other of said motor-vehicle structure or said mobile part of the motor-vehicle,
   wherein said first and second hinge elements are mounted articulated with respect to each other about a hinge axis,
   wherein said second hinge element is articulated to said first hinge element by means of an articulation portion having two pins defining the hinge axis and projecting in opposite directions from two sides of said articulation portion of the second hinge element,
   wherein said pins are formed in a single piece with the second hinge element,
   wherein the first hinge element and the second hinge element are obtained by an additive manufacturing technique in an already reciprocally articulated condition, with said pins mounted with clearance within respective articulation seats formed on first and second flanges of the first hinge element adjacent to said sides of the second hinge element, so that the two hinge elements are permanently bound to each other,
   two bushing-shaped members, each of said members interposed between one of said two pins and the respective articulation seat.

2. The hinge of a motor-vehicle mobile part according to claim 1, wherein said articulation portion of the second hinge element includes two inner flanges that define said sides.

3. The hinge of a motor-vehicle mobile part according to claim 2, wherein a central recess is formed between the two inner flanges.

4. The hinge of a motor-vehicle mobile part according to claim 3, wherein said first and second hinge elements each comprise a connection bracket provided with respective holes for engaging with a plurality of fastening members, for connection to either said motor-vehicle structure or said mobile part of the motor-vehicle.

5. The hinge of a motor-vehicle mobile part according to claim 1, wherein said first and second hinge elements each comprise a connection bracket provided with respective holes for engaging with a plurality of fastening members, for connection to either said motor-vehicle structure or said mobile part of the motor-vehicle.

6. The hinge of a motor-vehicle mobile part according to claim 5, wherein the second hinge element has a central portion which joins said bracket to said articulation portion, including a central hollow portion.

7. A mobile part of said motor-vehicle having said hinge according to claim 6 pre-assembled to said mobile part by said respective fastening members.

8. The hinge of a motor-vehicle mobile part according to claim 5, wherein each bushing-shaped member has a base surface, a side wall and an upper surface, wherein:
   said base surface is arranged in abutment on a respective side of the second hinge element,
   said upper surface is adjacent to an outer side of the respective flange of the first hinge element,
   said side wall is arranged between the pin and the respective articulation seat,
   said bushing-shaped member is mounted by interference fit within the respective articulation seat, so as to allow the respective pins to rotate therein.

9. The hinge of a motor-vehicle mobile part according to claim 1, wherein each bushing-shaped member has a base surface, a side wall and an upper surface, wherein:
   said base surface is arranged in abutment on a respective side of the second hinge element,
   said upper surface is adjacent to an outer side of the respective flange of the first hinge element,
   said side wall is arranged between the pin and the respective articulation seat,
   said bushing-shaped member is mounted by interference fit within the respective articulation seat, so as to allow the respective pins to rotate therein.

10. The hinge of a motor-vehicle mobile part according to claim 9, wherein said bushing-shaped members are made of a material with a low friction coefficient.

11. The hinge of a motor-vehicle mobile part according to claim 1, wherein said bushing-shaped members are made of a material with a low friction coefficient.

12. A mobile part of a motor-vehicle having said hinge according to claim 1 pre-assembled to said mobile part by respective fastening members.

13. A body of said motor-vehicle including said hinge according to claim 12 pre-assembled to said body by said respective fastening members.

14. A body of a motor-vehicle including said hinge according to claim 1 pre-assembled to said body by respective fastening members.

15. A motor-vehicle having at least one said hinge according to claim 14.

16. A motor-vehicle having at least one said hinge according to claim 1.

17. A method for producing a motor-vehicle hinge comprising the following steps:
   producing at least one first hinge element and a second hinge element already reciprocally articulated to each other about a hinge axis by an additive manufacturing technique,
   wherein said second hinge element is articulated to said first hinge element by an articulation portion having two pins defining the hinge axis and projecting in opposite directions from two sides of said articulation portion of the second hinge element, wherein said pins are mounted with clearance within respective articulation seats formed on two flanges of the first hinge element adjacent to said sides of the second hinge element, so that the two hinge elements are permanently bound to each other, mounting two bushing-shaped members within a respective articulation seat in such a way that each bushing-shaped member is interposed between one of said two pins and the respective articulation seat.

\* \* \* \* \*